United States Patent
Buck et al.

(10) Patent No.: US 8,666,750 B2
(45) Date of Patent: Mar. 4, 2014

(54) VOICE CONTROL SYSTEM

(75) Inventors: Markus Buck, Biberach (DE); Lars König, Ulm (DE); Gerhard Uwe Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1257 days.

(21) Appl. No.: 12/023,485

(22) Filed: Jan. 31, 2008

(65) Prior Publication Data

US 2008/0262849 A1   Oct. 23, 2008

(30) Foreign Application Priority Data

Feb. 2, 2007   (EP) ..................................... 07002342

(51) Int. Cl.
*G10L 17/00*   (2013.01)
*G10L 21/00*   (2013.01)

(52) U.S. Cl.
USPC ........ 704/275; 704/270; 704/270.1; 704/231; 704/246; 704/251

(58) Field of Classification Search
USPC .............. 704/275, 251, 274, 270, 271, 270.1, 704/246, 231
See application file for complete search history.

(56) References Cited

U.S. PATENT DOCUMENTS

| | | | | | |
|---|---|---|---|---|---|
| 4,746,912 | A | * | 5/1988 | Clifford et al. | 340/691.5 |
| 5,224,151 | A | * | 6/1993 | Bowen et al. | 455/569.1 |
| 5,239,586 | A | * | 8/1993 | Marui | 704/270 |
| 5,337,353 | A | * | 8/1994 | Boie et al. | 379/433.01 |
| 5,712,911 | A | * | 1/1998 | Her | 379/388.01 |
| 5,855,003 | A | * | 12/1998 | Ladden et al. | 704/270 |
| 6,041,127 | A | * | 3/2000 | Elko | 381/92 |
| 6,256,611 | B1 | * | 7/2001 | Ali-Yrkko | 704/275 |
| 6,397,186 | B1 | * | 5/2002 | Bush et al. | 704/274 |
| 6,532,447 | B1 | * | 3/2003 | Christensson | 704/275 |
| 7,181,021 | B2 | * | 2/2007 | Raptopoulos et al. | 381/71.14 |
| 7,418,392 | B1 | * | 8/2008 | Mozer et al. | 704/275 |
| 7,643,641 | B2 | * | 1/2010 | Haulick et al. | 381/92 |
| 7,890,863 | B2 | * | 2/2011 | Grant et al. | 715/702 |
| 2003/0182132 | A1 | * | 9/2003 | Niemoeller | 704/275 |
| 2004/0153306 | A1 | * | 8/2004 | Tanner et al. | 704/4 |
| 2005/0219068 | A1 | * | 10/2005 | Jones et al. | 341/50 |
| 2007/0009124 | A1 | * | 1/2007 | Larsen | 381/315 |
| 2008/0037727 | A1 | * | 2/2008 | Sivertsen et al. | 379/88.13 |
| 2008/0154610 | A1 | * | 6/2008 | Mahlbacher | 704/275 |

FOREIGN PATENT DOCUMENTS

WO   WO 03/049003 A2   6/2003
WO   WO 2006/121896 A2   11/2006

OTHER PUBLICATIONS

Brandstein, M., Ward, D., Eds. "Microphone Arrays—Signal Processing Techniques and Applications", Springer-Verlag Berlin Heidelberg New York 2001. pp. 19-32.
Griffiths, L. et al., "An Alternative Approach to Linearly Constrained Adaptive Beamforming", IEEE Transactions on Antennas and Propagation, vol. AP-30, No. 1, 1982, pp. 27-34.

(Continued)

*Primary Examiner* — Pierre-Louis Desir
*Assistant Examiner* — Abdelali Serrou
(74) *Attorney, Agent, or Firm* — Daly, Crowley, Mofford & Durkee, LLP

(57) ABSTRACT

A voice control system allows a user to control a device through voice commands. The voice control system includes a speech recognition unit that receives a control signal from a mobile device and a speech signal from a user. The speech recognition unit configures speech recognition settings in response to the control signal to improve speech recognition.

25 Claims, 6 Drawing Sheets

(56) References Cited

OTHER PUBLICATIONS

Mueller, S. et al., "Transfer-Function Measurement with Sweeps", Journal of the Audio Engineering Society, New York, NY. vol. 49, No. 6. Jun. 2001, pp. 443-471.

Stanford, V. et al., "The Nist Smart Space and Meeting Room Projects: Signals, Acquisition, Annotation, and Metrics", IEEE International Conference on Acoustics, Speech, and Signal Processing. vol. 1, Apr. 6, 2003 pp. IV736-1V739.

Viikki, O: "ASR in Portable Wireless Devices", Automatic Speech Recognition and Understanding, 2001. IEEE Workshop, Dec. 9, 2001. pp. 96-102.

Japanese Office Action dated Mar. 12, 2013 in Japanese Patent Application No. 2008-19878, English translation included, 7 pages.

Response to Office Action for Japanese Patent Application No. 2008-019878 with English Translations of Claims, 15 pages, Aug. 12, 2013.

\* cited by examiner

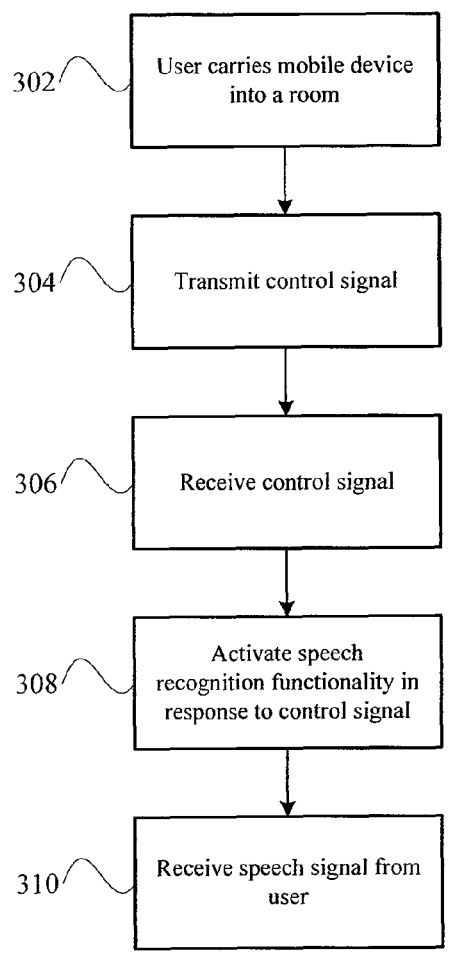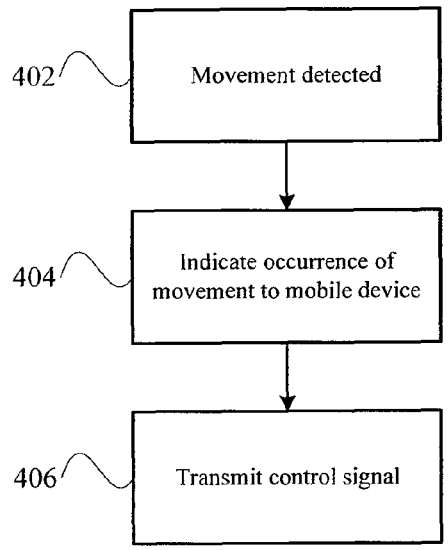
Figure 4
Figure 3

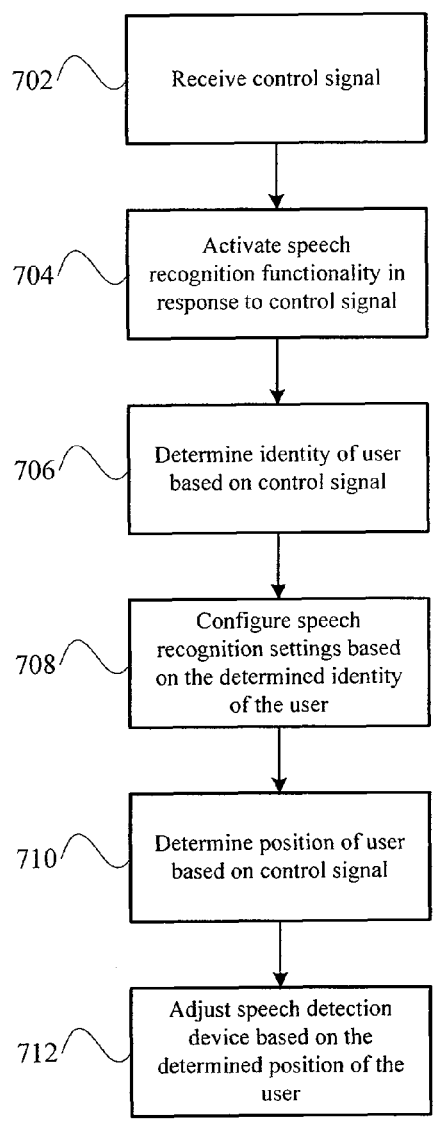
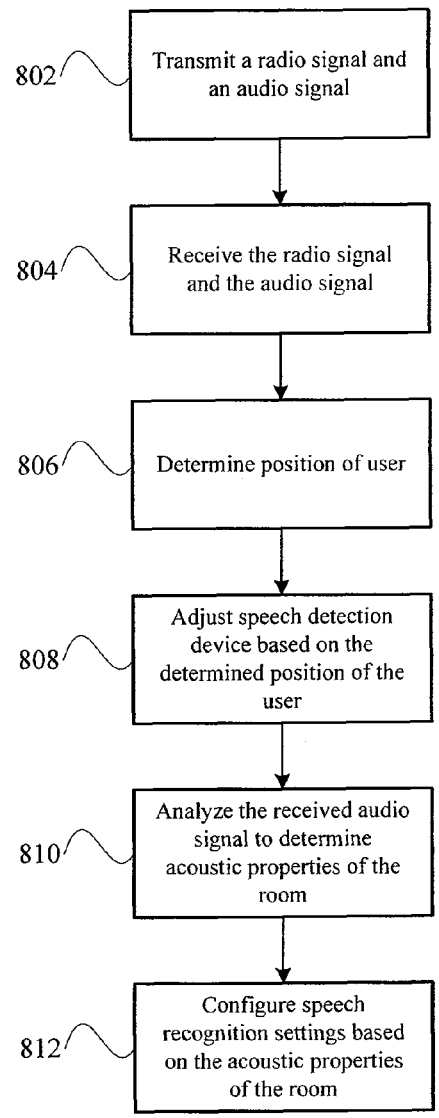
Figure 7
Figure 8

VOICE CONTROL SYSTEM

BACKGROUND OF THE INVENTION

1. Priority Claim

This application claims the benefit of priority from European Patent Application No. 07002342.9, filed Feb. 2, 2007, which is incorporated by reference.

2. Technical Field

The invention is directed to speech recognition and, more particularly, to voice control systems.

3. Related Art

Voice control systems allow users to communicate with computers. When engaging a voice control system, a user may speak a word or series of words. The voice control system may receive these spoken words and determine whether any actions are associated with the detected words. If the detected words represent a valid command, the voice control system may implement the associated command.

Voice control systems may provide a fast and efficient method of communication. However, this benefit may diminish as the quality of detected speech signals declines. To improve the quality of detected speech signals, some voice control systems may use multi-channel microphone arrays and/or beamforming techniques. These efforts may not be enough to improve the detected speech signals. Therefore, a need exists for a voice control system that provides a more reliable human-machine interaction.

SUMMARY

A voice control system allows a user to control a device through voice commands. The voice control system includes a speech recognition unit that receives a control signal from a mobile device and a speech signal from a user. The speech recognition unit configures speech recognition settings in response to the control signal to improve speech recognition.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is a method of activating speech recognition functionality in response to a received control signal.

FIG. 4 is a method of transmitting a control signal from a mobile device upon detecting a movement of the mobile device.

FIG. 7 is a method of performing multiple actions in response to a received control signal.

FIG. 8 is a method of determining the acoustic properties of a room.

DETAILED DESCRIPTION OF THE PREFERRED EMBODIMENTS

Figure 1:
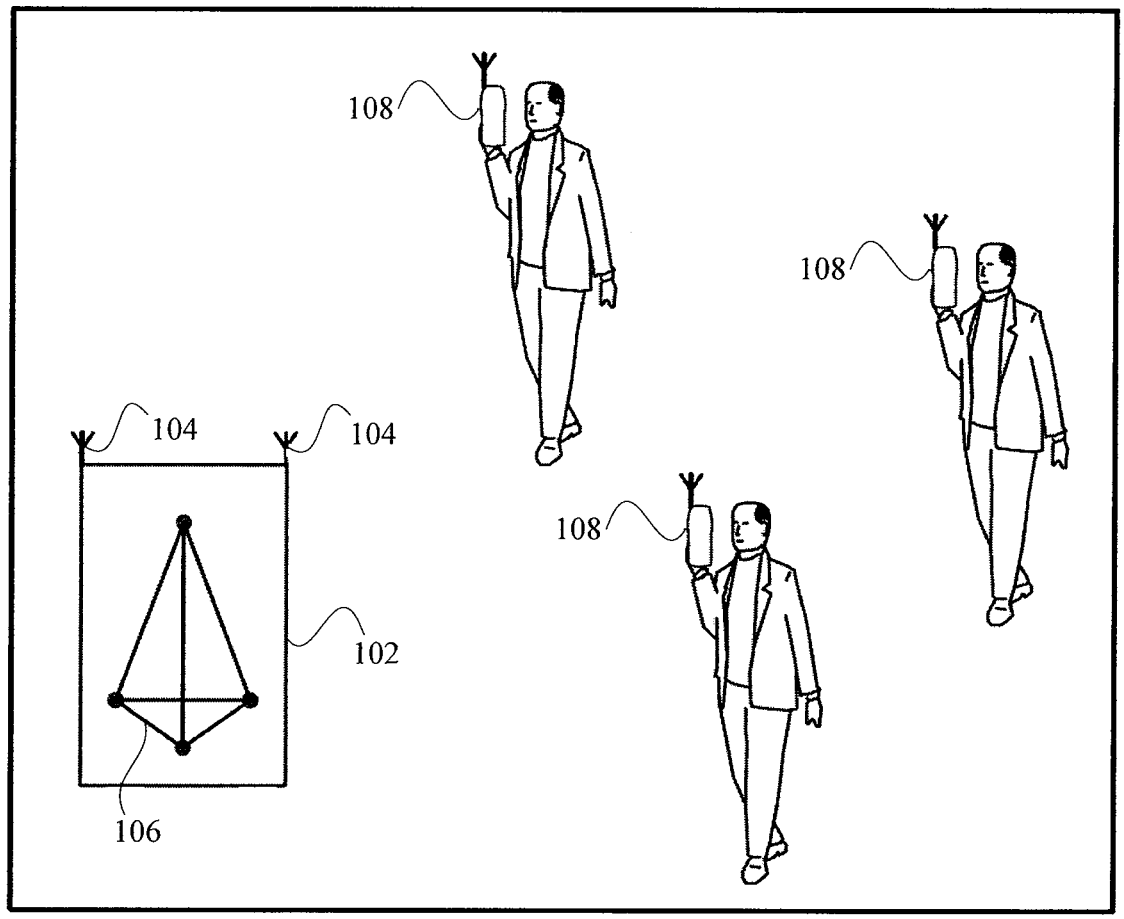
FIG. 1 is a voice control system.

FIG. 1 is a diagram of a voice control system that comprises a speech recognition unit 102. The speech recognition unit 102 may be a stationary unit. In some applications, the speech recognition unit 102 may be installed in a room, such as a living room or an office. In other applications, the speech recognition unit 102 may be installed in a vehicle. The speech recognition unit 102 may be part of an audio system, a visual system, or other electronic communication or entertainment devices. The speech recognition unit 102 may be located in a housing of the system controlled by voice command. Alternatively, the speech recognition unit 102 may be separate from the system controlled by voice commands.

The voice control system may include one or more receivers 104. The receivers 104 may be radio receivers, infrared receivers, acoustic receivers, or optical receivers. In some systems, the receivers 104 may be Bluetooth receivers. Bluetooth is a short-distance wireless communication technique that is relatively low in both cost and power consumption. The range of Bluetooth signals may be around ten meters. Alternatively, the range of Bluetooth signals may be extended to greater distances. In some systems, Bluetooth technology makes use of the Industrial, Scientific, and Medical ("ISM") band (about 2,402-about 2,480 GHz) that is globally available and license-free. To achieve a relatively high interference resistance, Bluetooth technology may employ a fast frequency hopping method with 1600 frequency changes per second. As an alternative to Bluetooth technology, the receivers 104 may use one or more other communication protocols. In some systems, the receivers 104 may be Wireless Local Area Network ("WLAN") receivers. In other systems, the receivers 104 may be infrared receivers, such as those receivers configured to receive infrared signals according to the standards of the Infrared Data Association ("IrDA"). In still other systems, the receivers 104 may be acoustic receivers, such as those receivers configured to receive high-frequency acoustic signals (e.g., acoustic signals above about 20 kHz). In still yet other systems, the receivers 104 may be optical receivers, such as those receivers configured to receive ultraviolet signals.

In FIG. 1, the speech recognition unit 102 communicates with two receivers 104, even though the system may communicate with more than two receivers 104 or a single receiver 104. The receivers 104 may determine a person's position. In systems that have multiple Bluetooth receivers, the Bluetooth receivers may perform Bluetooth mediated locating. Specifically, the Bluetooth receivers may use Bluetooth signals to determine a place or location of a user.

The voice control system may include one or more speech detection devices. The speech detection devices may convert acoustic signals into analog or digital data. In some systems, the speech detection device may include a device that converts sound into digital or analog signals. In other systems, the speech detection device may include one or more microphones. In yet other systems, the speech detection device may comprise a device that extracts voice from ambient noise, such as a microphone array 106 of FIG. 1. One or more of the microphones in the microphone array 106 may be directional microphones. The speech detection device, such as the microphone array 106, may detect speech signals from the user. The microphone array 106 may transmit the detected speech signals to speech recognition functionality of the speech recognition unit 102. The speech recognition functionality may attempt to recognize the semantic content of the detected speech signals.

The voice control system may communicate with one or more mobile devices 108. The mobile devices 108 may be associated with users. Specifically, the mobile devices 108 may be carried by the users. The mobile devices 108 may communicate with the speech recognition unit 102. The mobile devices 108 may transmit one or more control signals to the radio receivers 104 of the speech recognition unit 102. The control signals may indicate a presence or location of the user to the speech recognition unit 102. The control signals may be non-audible signals that are independent of the semantic content of the speech signals spoken by the users. The control signals transmitted from the mobile deices 108 may be separate from the speech signals spoken by the users. The control signals may be infrared signals, radio signals, optical signals, and/or acoustic signals that may either be in or out of the audible range. The mobile devices 108 may be mobile telephones, smartphones, personal digital assistants ("PDAs"), remote controls, headsets, hearing aids, or other mobile devices that may transmit control signals.

When a user of the voice control system is wearing a binaural hearing aid, the radio signals created by the binaural hearing aid may be used as control signals in the voice control system. The binaural hearing aid may comprise a left hearing aid component and a right hearing aid component. During operation, one or more radio signals may be transmitted between the left and right hearing aid components. The speech recognition unit 102 may detect the one or more radio signals to determine a presence or location of the user in a vicinity of the speech recognition unit 102. Alternatively, the binaural hearing aid may include a second transmitter to transmit control signals to the speech detection unit 102.

One or more users may be located in the vicinity of the speech recognition unit 102. Each of the users may carry a mobile device 108 to communicate with the speech recognition unit 102. A first user in the vicinity of the speech recognition unit 102 may be carrying a mobile device 108 that transmits a first control signal. A second user in the vicinity of the speech recognition unit 102 may carry a mobile device 108 that transmits a second control signal. The speech recognition unit 102 may distinguish the first user from the second user based on one, two, or more differentiating characteristics of the first and second control signals. In some systems, the mobile devices 108 may transmit different or varying control signals to the speech recognition unit 102. A modulator may vary frequency or other characteristic of the control signal prior to transmission. In other systems, the first and second control signals may carry information, such as a resource identifier, that may differentiate the first user from another user or users.

Figure 2:
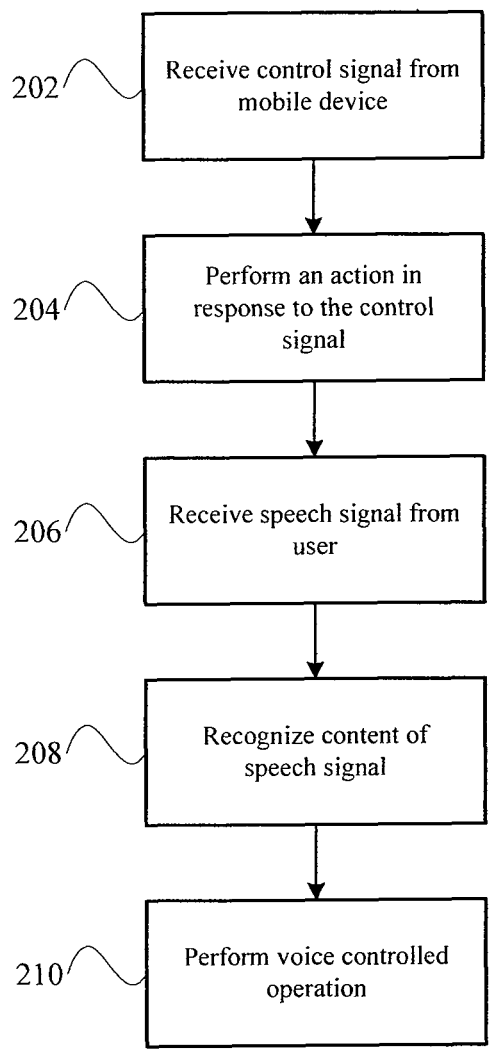
FIG. 2 is a method of operating a voice control system.

FIG. 2 is a method of operating the voice control system. At act 202, a control signal is received. Specifically, the speech recognition unit 102 may receive a control signal transmitted from a mobile device 108. At act 204, an action is performed in response to the control signal. Specifically, the speech recognition unit 102 may configure one or more speech recognition settings in response to the control signal to assist in a recognition of future speech signals from the user. At act 206, a speech signal is received from the user. Specifically, the microphone array 106, or other speech detection device, may detect a speech signal from the user. At act 208, the speech signal is analyzed to recognize semantic content of the speech signal. Specifically, the speech detection unit 102 may comprise speech recognition functionality that recognizes the content of the speech signal from the user. At act 210, a voice controlled operation is performed based on the content of the recognized speech signal. In one instance, the user may have uttered the keyword "louder." In response to the recognition of this utterance, voice control functionality of the speech recognition unit 102 may increase the volume of an audio system operated by voice control.

FIG. 3 is a method of activating speech recognition functionality in response to a received control signal. At act 302, a mobile device 108 may be moved. Specifically, a user may carry the mobile device 108 into a room where the speech recognition unit 102 is located. At act 304, a control signal is transmitted. Specifically, the mobile device 108 transmits the control signal. In some systems, the mobile device 108 may transmit a control signal repeatedly. In these systems, the mobile device 108 may transmit the signal on a synchronous or asynchronous schedule automatically without a user action. In other systems, the mobile device 108 transmits a control signal in response to a user's activity. In these systems, the user may activate a graphical or mechanical element of the mobile device 108 to transmit the control signal to the speech recognition unit 102.

At act 306, the control signal is received and processed. At act 308, speech recognition functionality is activated. Activating the speech recognition functionality in response to a received control signal allows the speech recognition functionality to detect and recognize a first utterance of a user. Where the control signal is transmitted upon a user's activity, the user may control when the speech recognition functionality is activated. The user may delay activation of the speech recognition functionality until the user is ready to interact with the voice control system. When the user enters a room in proximity to the speech recognition unit 102, the user may not want certain utterances to be detected by the speech recognition unit 102.

FIG. 4 is a method of transmitting a control signal from a mobile device 108 upon detecting a movement of the mobile device 108. As an alternative to periodically transmitting control signals or only transmitting a control signal upon demand of the user, the mobile device 108 may transmit a control signal upon detection of a movement of the mobile device 108. At act 402, a movement of the mobile device 108 is detected. Specifically, the mobile device 108 may comprise a motion sensor to detect movement of the mobile device 108. The motion sensor may be an acceleration sensor. At act 404, an indication of the occurrence of the detected movement is sent to the control signal transmission functionality of the mobile device 108. At act 406, the control signal is transmitted. Specifically, the mobile device 108 transmits the control signal in response to the detected movement of the mobile device 108. In some systems, sending control signals only upon a detected movement of the mobile device 108 may conserve more power than the case of a periodically transmitted control signal.

Figure 5:
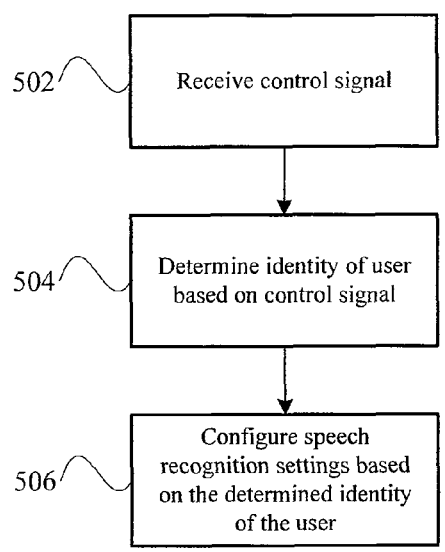
FIG. 5 is a method of determining an identity of a user based on a received control signal.

FIG. 5 is a method of determining an identity of a user based on a received control signal. At act 502, a control signal is received and processed. The speech recognition unit 102 may receive the control signal transmitted from a mobile device 108. At act 504, the identity of the user associated with the mobile device 108 is determined. The speech recognition unit 102 may process user information from the control signal to determine the identity of the user associated with the mobile device 108. In some systems, the identity of the user is determined by processing information transmitted in a control signal from the mobile device 108. In other systems, the identity of the user is determined by processing a characteristic of the control signal itself. Specifically, the control signals may be adjusted, regulated or changed (e.g., frequency, amplitude, or phase).

At act 506, one or more speech recognition settings are processed based on the determined identity of the user. Specifically, the speech recognition process may adjust one or more of the speech recognition settings based on the identity of the user to improve the reliability of the speech recognition results. In some processes, the speech recognition process may select the language of vocabulary lists used for speech recognition based on the determined identity of the user. In other processes, the speech recognition process may use an individually trained code book based on the determined identity of the user. In yet other processes, the user may have previously configured other personalized voice recognition features. Once the speech recognition process determines the identity of the user from the control signal, the process may activate these personalized features.

When individual users are identified through control signals received from mobile devices 108, a prioritization may occur. In this situation, a verbal command given by one of several users present in a room may be overruled by another command given by another speaker with a higher priority. The speech recognition unit 102 or process may also adjust an input, such as the microphone array 106 of FIG. 1, based on the priority of each user. Specifically, the recognition unit 102 or process may adjust the microphone array 106 to process the speech signals of higher priority users.

Figure 6:
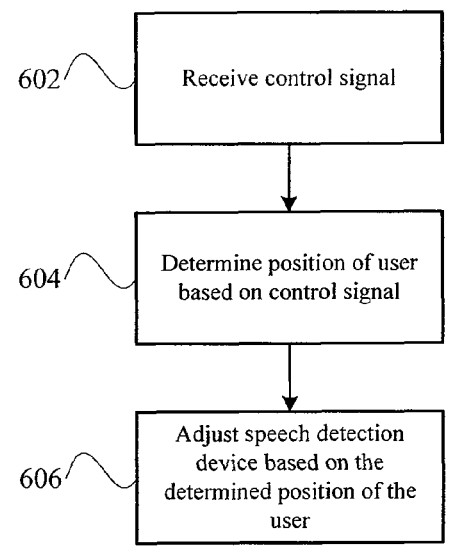
FIG. 6 is a method of determining a position of a user based on a received control signal.

FIG. 6 is a method of determining a position of a user based on a received control signal. At act 602, a control signal is received and processed. Specifically, the speech recognition process may receive a control signal transmitted from a mobile source. At act 604, the position of the user associated with the mobile source is identified. The speech recognition process may use information of the control signal to determine the position of the user associated with the mobile source. The speech recognition process may use transmission time measurements to determine the location of the user. Where the mobile source transmits the control signal periodically or repeatedly, the speech recognition process may track a position of the user as the user moves.

At act 606, one or more speech recognition settings are programmed based on the determined position of the user. Specifically, the speech recognition process may adjust one or more of the speech recognition settings based on the position of the user. Adaptation of parameters for speech recognition and adjustment of the input or input array may occur dynamically over time. In some processes, the speech detection process adjusts the input or input array based on the detected position of the user. The speech detection process may adjust the input array based on the determined position of the user to aim a directional input of the input array towards the position of the user.

The input or microphone array 106 may be adjusted according to the determined position/direction of the user in order to beamform the speech signals detected by the multiple inputs or microphones of the input or microphone array 106. The signal-to-noise ratio ("SNR") of a beamformed signal may exceed the SNR of non-beamformed signals. The performance of beamforming devices however may depend on knowing the position of the speaker relative to the input or microphone array 106. Knowing the position of the speaker allows the beamformer to set a preferential direction for detection of a wanted signal. Therefore, determining the position of the user based on the received control signals may improve the beamforming effort and thus the speech recognition result.

FIG. 7 is a method of performing multiple actions in response to a received control signal. At act 702, a control signal is received and processed. Specifically, the speech recognition unit 102 may receive a control signal transmitted from a mobile device 108. At act 704, speech recognition functionality of the speech recognition unit 102 is activated. At acts 706 and 708, the one or more speech recognition settings are configured based on the determined identity of the user. At acts 710 and 712, the speech detection device is adjusted based on the determined position of the user.

FIG. 8 is a method of determining the acoustic properties of a room. At act 802, a radio signal and an audio signal are transmitted. The audio signal may be within the audible frequency range and the radio signal may serve as the control signal. The mobile device 108 transmits the radio signal and the audio signal to the speech detection unit 102. At act 804, the radio signal and the audio signal are processed by the speech detection unit 102. Specifically, the audio signal may be detected by the microphone array 106 and the radio signal may be detected by the receiver 104.

At act 806, the position of the user may be determined. Specifically, the speech recognition unit 102 may determine the distance to the user carrying the mobile device 108 by measuring the difference in transmission time of the simultaneously transmitted audio and radio signals. At act 808, one or more speech recognition settings are configured based on the determined position of the user. Specifically, the microphone array 106 may be adjusted in accordance with the determined distance between the user and the microphone array 106. One or more parameters for signal processing may also be adjusted. Also, beamforming and signal filtering may be controlled and adapted based on the determined distance and direction from which the audio and radio signals are detected.

At act 810, the received audio signal is analyzed to determine the acoustic properties of the room. Specifically, the speech recognition unit 102 may estimate the impulse response of the loudspeaker-room-microphone system. The loudspeaker of this system may be part of the mobile device 108 that transmitted the audio signal. The audio signal transmitted by the mobile device 108 may be known by the speech recognition unit 102. The audio signal may represent a jingle that indicates to the user that voice control is activated. The signal characteristics of the audio signal (e.g., the frequency, the short-time spectrum, the power density, etc.) are stored in the speech recognition unit 102 and compared with the detected and processed audio signal transmitted by the mobile device 108 for analysis of the acoustic characteristics of the room. Based on this comparison, the reverberation characteristics of the room and the impulse response of the loudspeaker-room-microphone system may be estimated.

At act 812, one or more speech recognition settings are configured based on the determined acoustic properties of the room. Based on the acoustic properties of the room, the speech recognition unit 102 may adapt one or more processing parameters used for speech recognition. In some systems, the speech recognition unit 102 may adjust noise reduction filters and/or echo compensation filters based on the determined acoustic characteristics of the room. Some systems use these filters before speech recognition to enhance the quality of the detected speech signals. Adjusting the filters based on the determined acoustic characteristics of the room may improve the reliability of speech recognition at the speech recognition unit 102.

Figure 9:
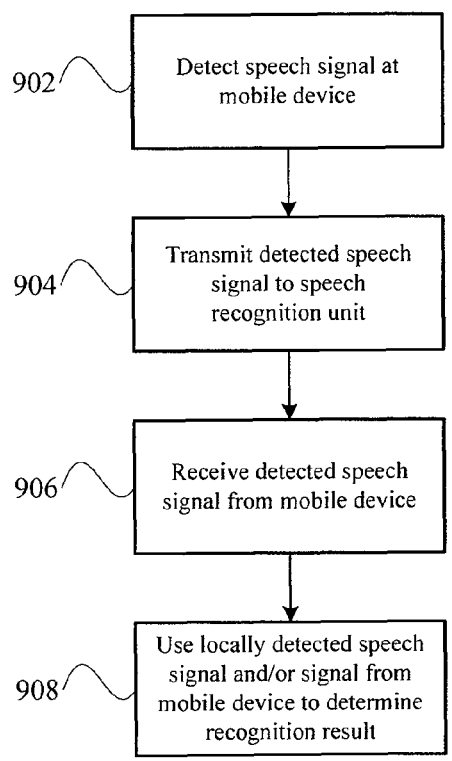
FIG. 9 is a method of transmitting detected speech signals from a mobile device to a speech recognition unit.

FIG. 9 is a method of transmitting detected speech signals from a mobile device 108 to a speech recognition unit 102. At act 902, the mobile device 108 (e.g., a mobile telephone) detects the speech signal from the user. The input of the mobile device 108 used for speech detection may be relatively close to the mouth of the user. Due to the proximity of the input to the user, the input of the mobile device 108 may not be significantly affected by a noisy environment or other acoustic properties of the room. Therefore, in some systems or environments, the speech signal detected by the input of the mobile device 108 may be more reliable than a speech signal detected at the speech recognition unit 102.

At act 904, the mobile device 108 transmits the detected speech signal to the speech recognition unit 102. In some systems, the detected speech signal is transmitted as part of a control signal sent between the mobile device 108 and the speech recognition system 102. In other systems, the detected speech signal is transmitted separately from the control signals sent between the mobile device 108 and the speech recognition system 102.

At act 906, the detected speech signal transmitted from the mobile device 108 is received at the speech recognition unit 102. At act 908, the speech recognition unit 102 attempts to determine a speech recognition result. In some systems, the speech recognition unit 102 uses the speech signal detected at the mobile device 108 to determine the speech recognition result. In other systems, the speech recognition unit 102 uses both the speech signal detected at the mobile device 108 and a speech signal detected by a local device (e.g., a signal detected by the microphone array 106) to determine the speech recognition result. In still other systems, only a portion of a speech signal transmitted from the mobile device 108 to the speech recognition unit 102 may used for speech recognition at the speech recognition unit 102. Because the sampling rate of standard mobile telephones may be about 8 kHz, speech recognition of sibilants transmitted to the speech recognition unit 102 may not be sufficiently reliable in some systems. Therefore, some systems may use the speech recognition unit 102 to detect sibilant portions of the speech signal. The speech recognition unit 102 may then use both locally detected portions of the speech signal (e.g., sibilant portions) and portions detected at the mobile device 108 (e.g., non-sibilant portions) to determine a speech recognition result.

Figure 10:
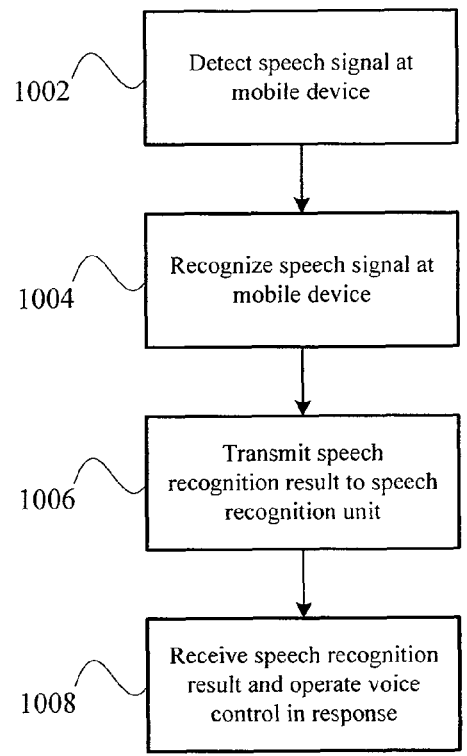
FIG. 10 is a method of transmitting a speech recognition result from a mobile device to a speech recognition unit.

FIG. 10 is a method of transmitting a speech recognition result from a mobile device 108 to the speech recognition unit 102. At act 1002, the mobile device 108 detects the speech signal from the user. At act 1004, the semantic content of the detected speech signal is recognized. Specifically, the mobile device 108 includes a speech recognizer that recognizes the content of the detected speech signal.

At act 1006, the mobile device 108 transmits the speech recognition result to the speech recognition unit 102. In some systems, the speech recognition result is transmitted as part of a control signal sent between the mobile device 108 and the speech recognition unit 102. In other systems, the speech recognition result is transmitted separately from the control signals sent between the mobile device 108 and the speech recognition unit 102. Specifically, the mobile device 108 may transmit a Bluetooth signal to convey the speech recognition result to the speech recognition unit 102.

At act 1008, the speech recognition unit 102 receives the speech recognition result from the mobile device 108 and performs a voice control action in response. In one instance, the user may utter the phrase "voice control on." The speech recognition functionality of the mobile device 108 may recognize the phrase and form a Bluetooth signal to be sent to the speech recognition unit 102. The speech recognition unit 102 may then activate speech recognition functionality in response. In some systems, the speech recognition signals from the mobile device 108 may be given priority over a speech signal detected and recognized at the stationary unit 102.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system, comprising: a speech recognition unit configured to:
   receive a first control signal comprising a radio signal from a wireless first mobile device associated with a first user, wherein the first control signal is unrelated to speech of the first user;
   receive a first speech signal from the first user associated with the first mobile device;
   receive an audio signal from the first mobile device and determine a distance of the first user by measuring a difference in transmission time between the radio signal and the audio signal; and
   identify the first user from the first control signal and configure speech settings for speech recognition of speech by the first user based on the identity of the first user and the determined distance.

2. The system according to claim 1, wherein the first control signal comprises radio signals from a binaural hearing aid.

3. The system according to claim 1, wherein the first control signal comprises a resource identifier.

4. The system according to claim 1, wherein the speech recognition unit is further configured to activate speech recognition functionality after receiving the first control signal.

5. The system according to claim 1, wherein the speech recognition unit is further configured to receive a second control signal from a wireless second mobile device associated with a second user.

6. The system according to claim 5, wherein the speech recognition unit is further configured to receive a second speech signal from the second user associated with the second mobile device and give priority to commands of a higher priority one of the first and second users.

7. The system according to claim 1, wherein the speech recognition unit is further configured to determine a position of the first user in relation to the speech recognition system.

8. The system according to claim 7, wherein the speech recognition unit is further configured to adjust a speech recognition setting based upon the position of the first user.

9. The system according to claim 1, wherein the system further includes a microphone may that can be adjusted based upon the distance of the first user.

10. The system according to claim 1, wherein the audio signal comprises a signal known by the speech recognition unit.

11. The system according to claim 10, wherein the audio signal indicates that voice control is activated.

12. The system according to claim 1, wherein the speech recognition unit is further configured to process the audio signal to determine acoustic properties of a room for adjusting settings of the speech recognition unit.

13. The system according to claim 1, wherein the speech recognition is further configured to receive a speech-recognized signal from the first mobile device, the speech-recognized signal comprising speech from the first user after speech recognition processing by the first mobile device.

14. The system according to claim 13, wherein the speech recognition unit is further configured to perform speech recognition using speech recognition from the first speech signal from the first user and the speech-recognized signal from the first mobile device.

15. The system according to claim 13, wherein the speech-recognized signal from the first mobile device comprises a voice control action, wherein the speech recognition unit is further configured to perform an action in response to the voice control action.

16. The system according to claim 15, wherein the voice control action includes turning voice control on for the speech recognition unit.

17. A method, comprising:
   receiving with a speech recognition unit a first control signal comprising a radio signal from a wireless first mobile device associated with a first user, wherein the first control signal is unrelated to speech of the first user;
   receiving a first speech signal from the first user associated with the first mobile device;
   receiving an audio signal from the first mobile device and determining a distance of the first user by measuring a difference in transmission time between the radio signal and the audio signal; and
   identifying, using a computer processor, the first user from the first control signal and configuring speech settings for speech recognition of speech by the first user based on the identity of the first user and the determined distance.

18. The method according to claim 17, wherein the first control signal comprises radio signals from a binaural hearing aid.

19. The method according to claim 17, further including activating speech recognition functionality after receiving the first control signal.

20. The method according to claim 17, further including receiving a second control signal from a wireless second mobile device associated with a second user.

21. The method according to claim 20, further including receiving a second speech signal from the second user associated with the second mobile device and give priority to commands of a higher priority one of the first and second users.

22. The method according to claim 17, further including determining a position of the first user in relation to the speech recognition system.

23. The method according to claim 22, further including adjusting a speech recognition setting based upon the position of the first user.

24. The method according to claim 17, further including processing the audio signal to determine acoustic properties of a room for adjusting settings of the speech recognition unit.

25. At least one non-transitory computer readable medium having stored instructions that enable a machine to:
   receive a first control signal comprising a radio signal from a wireless first mobile device associated with a first user, wherein the first control signal is unrelated to speech of the first user;
   receive a first speech signal from the first user associated with the first mobile device;
   receive an audio signal from the first mobile device and determine a distance of the first user by measuring a difference in transmission time between the radio signal and the audio signal; and identify the first user from the first control signal and configure speech settings for speech recognition of speech by the first user based on the identity of the first user and the determined distance.

* * * * *